United States Patent [19]

Sherif

[11] Patent Number: 4,485,190
[45] Date of Patent: Nov. 27, 1984

[54] PROCESS FOR PREPARING AN OXIDATION CATALYST

[75] Inventor: Fawzy G. Sherif, Stony Point, N.Y.

[73] Assignee: Stauffer Chemical Company, Westport, Conn.

[21] Appl. No.: 136,585

[22] Filed: Apr. 2, 1980

[51] Int. Cl.³ .................... B01J 27/02; C01B 17/68
[52] U.S. Cl. ...................................... 502/243; 423/535
[58] Field of Search ............... 252/439, 440, 456; 423/535; 502/243

[56] References Cited

U.S. PATENT DOCUMENTS

| | | | |
|---|---|---|---|
| 2,799,560 | 7/1957 | Davies | 423/535 |
| 3,186,794 | 6/1965 | Davies | 423/535 |
| 4,126,578 | 11/1978 | Sherif | 423/535 |
| 4,184,980 | 1/1980 | Sherif et al. | 423/535 |
| 4,193,894 | 3/1980 | Villadsen | 423/535 |

*Primary Examiner*—John Doll
*Assistant Examiner*—Wayne A. Langel

[57] ABSTRACT

A process for preparing a catalyst for the oxidation of sulfur dioxide comprising:

(a) intimately contacting a siliceous support with a mixture of a water-insoluble vanadium (V) compound, a potassium (K) salt so that the K/V molar ratio is maintained between about 2.5 and about 4.0, a source of sulfite anion, a water-insoluble sodium (Na) salt of an acid having a pKa between about 3 and about 7 so that the K/Na molar ratio is between about 4 and about 8, and water to form an intermediate product;

(b) drying the intermediate product;

(c) calcining the dried intermediate product; and (d) sulfating the calcined intermediate product; thus providing a catalyst with high durability and high catalytic activity with an alpha-cristobalite content between from about 1 to about 30 percent.

The wet catalyst may be extruded into shaped forms such as spheres, cylinders, trilobes, or tablets before drying.

1 Claim, 1 Drawing Figure

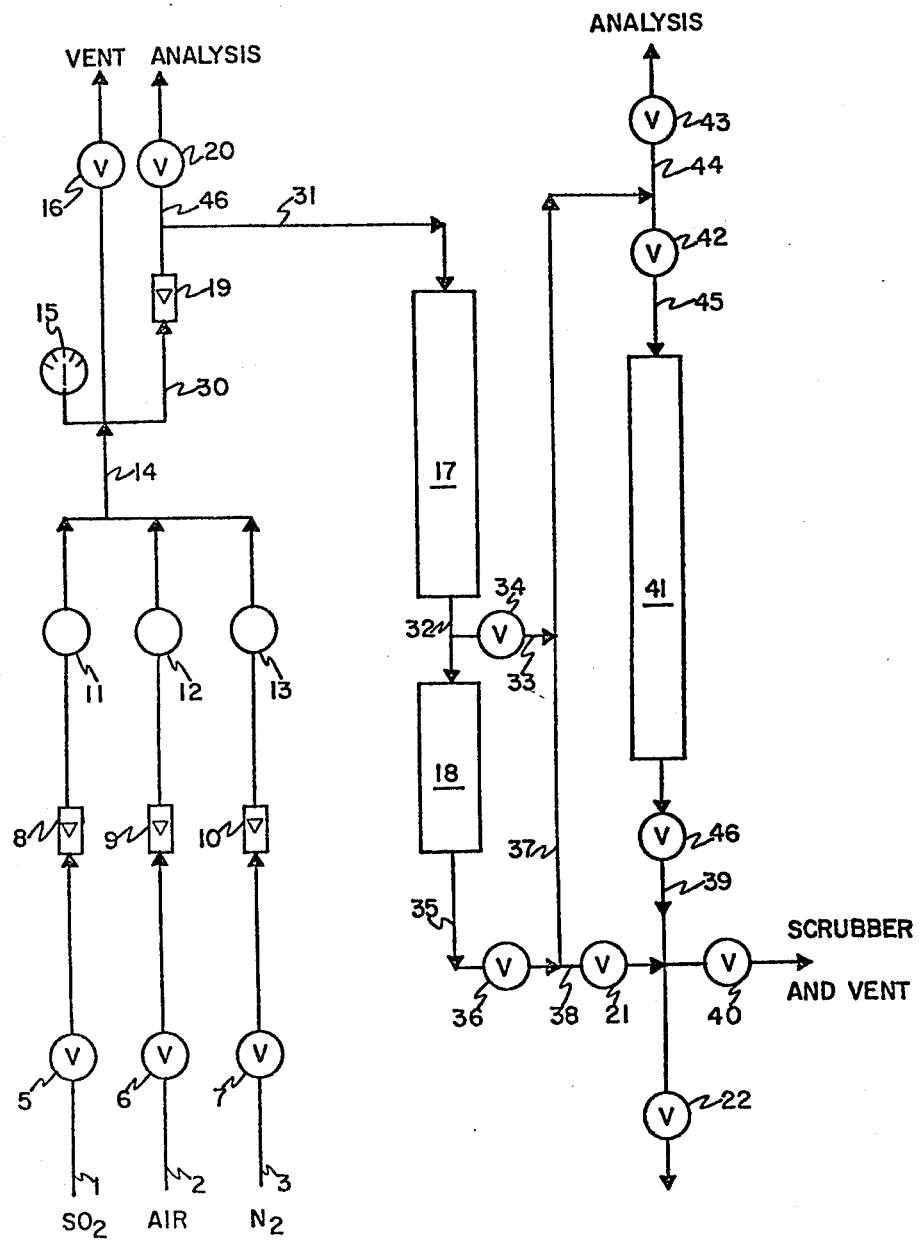

PROCESS FOR PREPARING AN OXIDATION CATALYST

BACKGROUND OF THE INVENTION

1. Field of the Invention

This invention relates to catalysts for the oxidation of sulfur dioxide. More particularly it relates to a process for preparing such catalysts.

Sulfuric acid is produced on a commercial scale by the vanadium-catalyzed oxidation of sulfur dioxide to sulfur trioxide in the gaseous phase followed by absorption of the sulfur trioxide in an aqueous solution.

It is advantageous to disperse the vanadium active element on a microporous carrier or support. The support has a variety of beneficial functions including a high surface area to increase reaction rate, high porosity to maximize diffusion, physical integrity to minimize dusting, thermal resistance so that the vanadium composition may be molten without disintegration or fusion of the catalyst particles, molded shaped form to minimize pressure drop, and chemical inertness. Until the instant invention a process for preparing catalysts with both high activity and outstanding durability in the form of shaped articles larger than cylinders of one cm diameter suitable for commercial production has not been disclosed.

2. Description of the Prior Art

The addition of many other metals to a potassium/vanadium oxidation catalyst on kieselguhr was disclosed by Simecek et al, J. Catalysis 14, 287–292 (1969); 18, 83–89 (1970) with the intent of lowering the temperature of maximum activity for their catalysts. These workers employed ammonium as the solubilizing cation, bisulfate as the solubilizing anion, sodium oxide as a source of sodium and operated in an unknown pH range. There is no disclosure that these workers intended or achieved a more durable catalyst by addition of sodium.

Alkali metal salts mixed with iron and manganese were added to vanadium oxidation catalysts by Topsøe and Nielsen, Trans. Dan. Acad. Tech. Sci 1, 3–23 (1947). These workers intended to increase the viscosity of the melted catalyst surface. They did not measure durability, they mixed additives, employed sulfate and often pyrosulfate as solubilizing anions, maintained highly alkaline conditions, and found less not more catalytic activity upon partial substitution of potassium by sodium.

In Japanese patent application No. 76-139, 586 (1976); C.A. 86, 111639k (1977) (cf. British Specification No. 1,520,336 (1978)) Hara et al. disclose the admixture of potassium and sodium sulfates expressed as oxides on a vanadium catalyst of pelletized diatomaceous earth. Only conversion not durability data are given. In their impregnation method potassium sulfate may form an interfering precipitate, since sulfuric acid not sulfite is employed as the neutralizing agent. No mention is made of the presence of crystalline domains. The sodium ions adventitiously present were derived from commercial impurities and were considered undesirable.

In U.S. Pat. No. 3,448,061 granted to Mika on June 3, 1969 the use of alkali metal compounds as promotors in catalysts containing vanadium is disclosed. The use of alkali metal compounds is restricted to the neutral range of pH from 6.5 to 9, with pH 7.5 to 8.5 preferred.

3. Objects of the Invention

An object of the present invention is to provide a hardened vanadium catalyst which can be utilized in the form of shaped articles as durable, useful catalysts in the "contact" process for the oxidation of sulfur dioxide. Another object of the invention is to provide catalysts with a high level of activity over a wide range of temperatures for the "contact" oxidation process. Other objects of the invention will be apparent to those skilled in the art from the description and examples below.

SUMMARY OF THE INVENTION

According to the present invention, a highly active and durable catalyst containing vanadium can be prepared by a process comprising the following steps:

(a) intimately contacting a siliceous support with a water-soluble vanadium (V) compound, a potassium (K) salt so that the K/V molar ratio is maintained between about 2.5 and about 4.0, a source of sulfite anion, a water-soluble sodium (Na) salt of an acid having a pKa between about 3 and about 7 so that K/Na molar ratio is between about 4 and about 8, and water to form an intermediate product;

(b) drying the intermediate product;

(c) calcining the dried intermediate product; and (d) sulfating the calcined intermediate product, thus providing a catalyst with high durability and high catalytic activity with an alpha-cristobalite content between from about 1 to about 30 percent.

For commercial purposes it is advantageous to shape the catalyst into spheres, cylinders, trilobes, or tablets to decrease the pressure drop of gaseous flow passing through a bed of catalyst and eliminate dusting.

BRIEF DESCRIPTION OF THE DRAWING

The FIGURE is a diagrammatic drawing of the apparatus for measuring the activity of the catalyst.

DETAILED DESCRIPTION OF THE INVENTION

A supported vanadium composition remains after 80 years the standard catalyst for oxidizing sulfur dioxide to make sulfuric acid or for environmental improvement. The support or carrier plays several roles. Firstly, the support provides a surface on which expensive vanadium moieties, often "promoted" by other metal salts, can be deposited in a thin layer to minimize cost. Secondly, a support of high surface area maximizes the activity of the catalyst. A support of high porosity and pore volume maximizes the rate of diffusion of both gaseous reactants and product. Thermal stability of the support allows the vanadium to be in a molten or plastic state, in which its activity is enhanced, while the shaped article maintains its microporous nature without collapse Chemical stability allows the fragile microporous structure of the support to withstand the hot sulfur trioxide formed by oxidation of sulfur dioxide.

In the finished catalyst two properties are of major importance: catalytic activity and durability. In a typical commercial sulfuric acid plant there are several catalytic stages of oxidation for sulfur dioxide, often a by-product of another process. Generally the first stage is run at a higher temperature than the succeeding stages. The ideal catalyst will have a high catalytic activity over a broad temperature range from about 350° to 600° C. and over a broad range of sulfur dioxide/sulfur trioxide ratios. By the test procedure below, run in the apparatus of the FIGURE, a $k_v \times 10^{-7}$ rate constant of 115 or more at 432° C. is considered high catalytic activity.

The durability of a catalyst can be measured by its resistance to abrasion after heating at about 816° C. for 24 hours in air, treatment with sulfur oxides at 432° C. for two hours, and cooling to ambient temperature, as described below. Durability is the figure of merit for defining physical thermal stability; resistance to dusting in a hot, gaseous stream; resistance to abrasion in a bed of shaped pellets; and spalling, cracking, or crumbling in use. In a commercial installation the durability is a prime consideration. The capital investment in the catalyst is measured by the number of years it remains in service. For cylinders the larger the shaped article, the lower the pressure drop in the reactor. Prior to the present invention the largest diameter durable catalyst in commerce with high activity were cylinders of 0.56 cm. Employing the hardening agent of the present invention, sodium preferably in the form of sodium carbonate, highly active durable catalysts can be made in the form of one cm diameter cylinders or even higher.

The preferred chemical composition for a support which provides a catalyst with high durability and high catalytic activity has been found to be a high silica content coupled with moderate alumina content. High silica content is used herein to denote a support containing at least 85 percent silica by weight. Less preferably a silica content of 65 percent or more may be used. The presence of alumina enhances carrier durability, but at moderate concentrations of alumina lowers its catalytic activity. Carriers with up to 12 weight percent alumina have been used. An alumina content of about 2 to about 6 percent is useful. It has now been discovered that supports containing about 3 to about 5 percent are preferred with from about 3.3 to about 3.7 percent highly preferred for the instant invention. Iron oxide content should be below about 2 weight percent to maintain high activity of the catalyst.

Siliceous materials employed as catalyst carriers prior to this invention have ranged in surface area from about 0.1 m$^2$/g (ground glass and rocks) to over 100 m$^2$/g (molecular sieves from aluminosilicates). In the practice of this invention surface areas from about 10 to about 50 m$^2$/g have been found suitable. The most useful diatomaceous earths and clays have surface areas from about 30 to about 50 m$^2$/g.

The surface area of microporous supports may be measured by means of the adsorption of nitrogen gas. Following the well-known BET (Brunauer-Emmett-Teller) equation, the surface area may be computed from the adsorptive data.

Bulk density of a powdered catalyst support is a measure of its particulate shape and openness. In fact, it is highly preferable to employ the catalyst in the form of a shaped article rather than a powder. Before impregnation of the actual catalytic moieties and before being formed into shaped articles such as spheres, tablets, trilobes, or cylindrical pellets, the bulk density of the catalyst supports range from about 0.10 to about 0.35 g/cc. A bulk density of about 0.1 to about 0.2 g/cc is preferred. The most efficacious catalyst supports have an average loose bulk density before impregnation of about 0.13 to about 0.14 g/cc, as in Ser. No. 104,330 of Dec. 17, 1979.

In molded or extruded form the density of finished catalysts for the contact process for making sulfuric acid is generally in the range from about 0.4 to about 0.8 g/cc. The inventor has discovered that for both durability and high catalytic activity the preferred bulk density of the catalyst of the present invention ranges from about 0.6 to about 0.8 g/cc.

The true specific gravity of the microporous, siliceous material used in this invention ranges from about 2.1 to about 2.3 g/cc. It is measured in a pycnometer against distilled water, usually at 25° C.

The pore volume, in ml/g, is determined by the mercury intrusion method according to the method described in Frevel, L. K. and Kressley, L. J., *Anal Chem.*, 35, 1492 (1963). "Modifications in Mercury Porosimetry". The pore volume should be greater than 2 ml/g for the practice of this invention.

The percent porosity is measured by the water titration method, as described in Innes, W. B., *Anal. Chem.*, 28, 332 (1956) "Total Porosity and Particle Densitys of Fluid Catalysts by Liquid Titration". For the supports of the instant invention the percent porosity should be greater than 65 percent, preferably greater than 75 percent.

The mean pore diameter, is determined by the mercury intrusion method as described in Frevel, L. K. and Kressley, L. J., *Anal. Chem.*, 35, 1492 (1963), "Modifications in Mercury Porosimetry". The mean pore size for the siliceous support material can range from about 0.3 to about 2.5 microns with those support materials having a mean in the range from about 0.3 to about 0.5 microns preferred.

At least two types of siliceous materials meet the chemical and physical constraints detailed above. One of these is acid-leached clay; the other diatomaceous earth. Acid-leached clay of the mortmorillonite type meets the criteria established here as a support for vanadium-type catalysts for the contact process of oxidizing sulfur dioxide. Diatomaceous earths are skeletal siliceous residues of either fresh water or marine diatoms which have the requisite low bulk density.

In the preferred process of this invention four chemical moieties must be added to the siliceous supporting material in order to form a catalyst: a source of vanadium, potassium ion, sulfite ion or a source of sulfite ion, and sodium ion. This addition is best carried out by impregnating the support with a solution containing all four moieties When vanadium oxide solid is the source of vanadium, it is solubilized by an alkali, most conveniently potassium hydroxide, since potassium ion is also necessary. In this case sulfur dioxide is an excellent source of sulfite ion since it neutralizes the excess alkalinity as well as generating sulfite ion. It has been found that bringing the pH of the imprenating solution to a value from about 9 to about 11 is advantageous.

Another convenient way of introducing potassium ion, vanadium, and sulfite ion into the aqueous solution is to employ potassium vanadate and potassium sulfite, both of which are water-soluble and slightly alkaline.

The four moieties in the impregnating solution are formulated to give the following relationships in order to practice the present invention:

(a) the potassium/vanadium molar ratio is between about 2.5 to about 4.0;

(b) the potassium/sodium molar ratio is between from about 4 to about 8.

Another parameter of this invention is that the water-soluble sodium salt supplying the sodium ion is the salt of an acid with a pKa between about 3 and about 7. Sodium carbonate is preferred; other suitable salts are sodium citrate, tartrate, acetate, formate, or propionate.

The solution preferred in the practice of the present invention should meet several other stringent criteria. It should be low in volume so that impregnation can be carried out in one stage with only one drying step. Ideally the volume of the impregnating solution should be about equal to the pore volume of the support material being treated. The solution should be alkaline but not so strongly that the siliceous support is degraded. The inventor has found that a pH of about 7 to about 12 may be employed. The preferred pH range is about 9 to about 11; a pH of about 10 is highly preferred.

Another parameter of the solution is the potassium/-vanadium ratio (K/V), often termed the alkali ratio. This must be balanced so that the moieties containing vanadium (e.g., $VO_3^-$, $VO_4^-$, $V_2O_7^=$) are kept in solution by the solubilizing potassium salts, preferably the sulfite. A molar ratio of K/V, often termed the alkali ratio, of about 2.5 to about 4.0 may be used, wherein about 3.0 for the K/V molar alkali ratio is highly preferred. Ammonium salts also be used to solubilize vanadium moieties, but an extra heating step is then required to drive off the resulting ammonia from the final catalyst. Potassium hydroxide is an economical source of potassium ion. It is, of course, quite alkaline and requires neutralization to ensure that the support is not degraded. In addition to the sulfite and the hydroxide, other potassium salts which may be employed are the bicarbonate, oxalate, tartrate, citrate, acetate, benzoate, sulfate, formate, nitrite, cyanate, thiocyanate, and thiosulfate. Lastly, components of the solution must remain soluble in the presence of a preferred source of sodium ion such as sodium carbonate.

Since sulfite and bisulfite salts (e.g., potassium sulfite, potassium bisulfite, ammonium sulfite, ammonium bisulfite) are highly solubilizing for vanadium moieties, sulfurous acid is preferred in the practice of the present invention to sulfuric acid as a neutralizing agent, when solid acidic vanadium pentoxide has been solubilized by an alkali such as potassium hydroxide. Before this invention it was commonplace to use strong alkali at the beginning of the preparation of an oxidation catalyst containing vanadium to dissolve the moieties containing vanadium often of complex and unknown structure. Usually sulfuric acid was used to acidify the mixture. Sulfurous acid in the form of sulfur dioxide gas, however, has the advantage of keeping the vanadium moieties soluble and of offering precise control of pH without diluting the impregnating solution. Furthermore, sulfur dioxide is an economical source of sulfite ion.

Although any source of sodium ion which does not poison or alter the nature of the vanadium catalyst can be useful in the practice of this invention, sodium carbonate is preferred. This compound is only mildly alkaline; it leaves no residue from the anion. Sodium hydroxide may also be employed. From about one-half to about four percent by weight sodium cation is preferred. The inventor has found that about 1.0 percent sodium ion by weight is highly preferred in imparting durability to the finished catalyst with no decrease in activity.

Forming the wet mass into shaped articles such as tablets, cylinders, spheres, or trilobes is of great practical importance, since a reaction bed of these shapes exerts a much lower pressure drop than a reaction bed of powdered catalyst. In the best mode of employing the instant invention a powdered support is first impregnated with a solution of reagents and then shaped. It may be useful to shape and mold the support and then impregnate the shaped articles with aqueous reagents Cylinders of catalyst of 5.55 mm diameter (7/32 inch) are useful but a diameter of at least 8.0 mm (5/16 inch) is preferred. Modified cylinders in the shape of a trilobe give about 18 percent larger surface area for carrying out the oxidation of sulfur dioxide. Also useful are spheres of 10 mm diameter, but a diameter of 12.5 mm (½ inch) is preferred for spheres. Any other shape which provides a high surface area and a low pressure drop, such as toroidal ring, is useful for the durable and highly active catalyst of this invention.

Typically the impregnated support has a vanadium composition of about four to about ten percent expressed as the pentoxide. After mixing, impregnating, and forming a shaped article—no matter what the order of these steps—the catalyst is dried. Drying is generally accomplished at temperatures between about 100° and about 250° C. Peferably temperatures of about 120° to about 160° are employed in order to remove most of the water from the shaped bodies without changing the chemical nature of the vandium moieties.

For the process of this invention, which includes the incorporation of sodium ion, a calcining step is preferred. Calcining the impregnated, shaped support normally takes place at a temperature of about 400° to about 600° C. for about one to 24 hours, preferably one to four hours, to remove the last traces of moisture, to fuse the catalytic moieties into their final physical state, and to strengthen the shaped form.

The calcined support may be activated (often termed sulfated), especially if sulfur dioxide has not been used in pretreating the vanadium solution prior to impregnation. Sulfation may be carried out in an air stream containing small amounts of from about 2 to about 6 percent by weight of sulfur trioxide plus from about 1 to about 3 percent by weight of sulfur dioxide. Sulfation is generally accomplished at about 300° to about 550° C.

Optionally, a post-treatment step at 500° to 650° C. with a gas containing oxygen and sulfur dioxide for one to four hours may be employed to enhance the crystallinity of the finished catalyst product.

The alpha-cristobalite content is measured by X-ray analysis employing a known peak for alpha-quartz of 3.34 Angstroms ($2\theta$ equals 26.7°) as a calibration standard. The angles in the range $2\theta$ from 20° to 28° are scanned. The peak for alpha cristobalite at 4.05 Angstroms ($2\theta$ equals 21.9°) is compared to the quartz peak. Analysis and comparison show that the most effective catalysts have alpha-cristobalite content from about one to about 30 percent. The method is a modification of the internal standard technique described in "Elements of X-ray Diffraction" by B. D. Cullity, Addison Wesley Publishing Co., Reading, Mass. 1967.

The activity of the catalysts described in the Examples was determined by measuring the conversions obtained by passing a gas stream containing sulfur dioxide, sulfur trioxide, oxygen and nitrogen over the catalysts at a controlled rate and temperature in the apparatus of the FIGURE.

The activity of the catalyst was determined by measuring the amount of sulfur dioxide converted to sulfur trioxide in a partially reacted gas stream. A gas stream containing sulfur dioxide, oxygen and nitrogen is first passed over a sulfur dioxide oxidation catalyst to convert from about 90 to about 97% of the sulfur dioxide to sulfur trioxide. The partially converted gas stream is passed over the catalyst to be tested. The catalyst being tested is maintained at a controlled temperature and the flow rate of gas containing sulfur dioxide contacting the catalyst is also carefully controlled. The sulfur dioxide content of the gas stream before and after contact with the catalyst being tested is measured. An activity constant for the particular catalyst is determined from the concentration of oxygen, sulfur dioxide and sulfur trioxide in the gas stream entering the test reactor and the concentration of oxygen, sulfur dioxide and sulfur trioxide in the gas stream leaving the test reactor at the temperature of testing.

The apparatus for catalyst testing is shown in the FIGURE; the calculation is given below. Cylinders of dry sulfur dioxide, air and nitrogen properly pressure-reduced are connected to lines 1, 2 and 3, respectively. The systems for metering the three gases are the same. The gases at a pressure of about 0.7 kg/cm² gauge enter the system and pass through shut-off valves 5, 6 and 7 in the sulfur dioxide, air and nitrogen lines. The gases are metered at a pressure of about 0.7 kg/cm² gauge through rotameters 8, 9 and 10 and low flow control means 11, 12 and 13. The gases are mixed in line 14 at a pressure between about 0.07 to 0.15 kg/cm² gauge. The pressure in line 14 is monitored by pressure gauge 15. Vent valve 16 permits the mixture of gases to be passed to the vent until the required mixture of gases is obtained. The total flow of mixed gases passing through line 30 is measured by rotameter 19. The mixed gas stream is passed through line 31 to reactor 17. A sample can be taken through line 46 and valve 20 to determine the concentration of sulfur dioxide in the gas stream.

Reactors 17 and 18 are electrically heated reactors and contain a sulfur dioxide oxidation catalyst. Reactors 17 and 18 are utilized to convert a portion of the sulfur dioxide in the gas stream to sulfur trioxide. One or two reactors are utilized depending upon the amount of preconversion desired for a particular run. The preconverted gas leaving reactor 17 passes through line 32 and can pass through line 33 and valve 34 to line 37 and directly to test reactor 41 through valve 42 and line 45. If additional preconversion is required, the partially converted gas stream may be passed through reactor 18, line 35 and valve 36 to line 37 which passes the preconverted gas to test reactor 41.

A sample of the preconverted gas in line 37 is removed from the system through line 44 and valve 43 for analysis. The preconverted gas stream is passed through valve 42 and line 45 to test reactor 41.

Test reactor 41 is immersed in a heat fluidized sand bath which is controlled to maintain the proper temperature in the reactor. Fifty cubic centimeters of catalyst is introduced into the reactor for testing. The effluent from the test reactor is passed through valve 40 to the scrubber and the vent. A sample for analysis can be taken from the system through valve 22.

Reactor 41 can be by-passed by passing the preconverted gas through line 38 and valve 21 to line 39.

During testing of a catalyst the sulfur dioxide concentrations in the gas stream entering the test reactor through line 45 and leaving the reactor through line 39 are monitored. The gas mixture entering reactors 17 and 18 through line 31 is adjusted to contain about 9.5 percent sulfur dioxide, about 11.4 percent oxygen and the balance, nitrogen. The catalyst being tested is equilibrated by passing the preconverted gas stream over the catalyst at the test temperature for two hours before sampling the gas stream. The sulfur dioxide concentration in the preconverted gas stream and in the gas stream after contact with the catalyst being tested is determined by iodometric titration.

The amount of sulfur dioxide and oxygen in the gas stream entering and leaving the test reactor is measured. The rate constant k, is computed from the data using the following rate expression.

$$\text{rate} = k \left(\frac{P_{SO_2}}{P_{SO_3}}\right)^{0.5} \cdot P_{O_2} \left[1 - \left(\frac{P_{SO_3}}{P_{O_2}^{0.5} \cdot P_{SO_2} \cdot k_{eq}}\right)^{0.5}\right]$$

where
$k_{eq}$ = equilibrium constant
$\log k_{eq} = 5186.5/T_A - 0.611 \log T_A - 6.7497$
$T_A$ = temperature, °K.
$P_{SO_2}$ = partial pressure of $SO_2$ in atmospheres
$P_{SO_3}$ = partial pressure of $SO_3$ in atmospheres formed by contact with the catalyst being tested
$P_{O_2}$ = partial pressure of $O_2$ in atmospheres.

$$\left[\text{The rate constant } k = \frac{g \text{ moles } SO_2 \text{ converted}}{\text{atmosphere} \times \text{second} \times \text{gram catalyst}}\right]$$

The rate constant based on volume, $k_v$ reported herein = $k \times$ bulk density of sulfated catalyst in grams per cubic centimeter.

The durability of the catalyst (Accelerated Abrasion Loss) is measured by heating 150 grams of the fresh catalyst pellets at 816° C. for 24 hours. The catalyst pellets are then contacted with a nitrogen stream containing about 11.4 percent oxygen, about 4.0 percent sulfur dioxide, and about 5.0 percent sulfur trioxide for two hours at 432° C. A 100-gram sample of the heated and reacted catalyst is shaken over a standard 20-mesh sieve, Tyler Sieve Series, for one hour using a Rotap shaker. The loss in weight after shaking for one hour indicates the durability of the catalyst. The durability of the catalyst is indicated as the percent loss through the 20-mesh screen. The lower numbers indicate a more durable catalyst. This Accelerated Abrasion Loss test has been found to correlate closely with durability experienced with sulfur dioxide oxidation catalysts under commercial process operating conditions.

The instant invention is illustrated but not limited by the following examples.

EXAMPLE 1

This Example illustrates a preferred mode for carrying out the process of the instant invention to yield a vanadium-containing catalyst with both high activity and good durability.

The support chosen was a natural uncalcined diatomaceous earth of the fresh water type known to contain 0.5 weight percent sodium expressed as the oxide. In this experiment 830 g were used.

An impregnating solution was prepared by first dissolving 194.5 g of reagent grade potassium hydroxide pellets in 238 g of distilled water to give a 45 percent KOH solution. Slowly with stirring at about 180 rpm, 109 g of commercial grade vanadium pentoxide was added to the KOH solution over a period of about five minutes. The temperature of the caustic solution, previously about 40° C., rose to about 80° C. The vanadium solution was dark gray in color and contained about 0.18 percent insoluble black material. The pH of the vanadium solution was 14. Water was added to bring the volume of the solution to 800 ml. and reduce the temperature to about 40° C.

A gas stream of about 14 percent sulfur dioxide in air was then bubbled into the solution at about 2 l/m until the pH was about 10. The total amount of $SO_2$ introduced was 48 g. Then 22 g of reagent grade sodium carbonate was added to the mixture, and the total volume brought to 900 ml.

The solution was added slowly to the granular support which was being stirred in a Hobart mixer; the the volume of impregnating solution (900 ml) was about equal to that of the adsorption capacity of the support. The damp impregnated mixture was then extruded in a California Pellet Mill employing a die 2.55 cm. thick with 0.80 cm diameter holes. The extrudate was chopped to give pellets with an average length of about 1.2 cm.

The wet cylindrical pellets were dried at about 120° C. for eight hours, calcined at about 538° C. for four hours, and then sulfated for two hours at about 432° C. by exposure to an air stream containing about four percent sulfur dioxide and five percent sulfur trioxide.

Two aliquots of the above preparation, termed 1A and 1B, were analyzed by the methods given above with the following results:

|            | Bulk Density (g/ml) | Catalytic Activity $k_v \times 10^{-7}$ at 432° C. | Durability % Acc. Abr. Loss |
|------------|---------------------|---------------------------------------------------|------------------------------|
| Example 1A | 0.76                | 124;122                                           | 4.0                          |
| Example 1B | 0.74                | 118;126                                           | 6.1                          |

A catalytic rate constant greater than 115 and an accelerated abrasion loss of less than 12 percent is considered excellent in commercial catalysts of this diameter.

EXAMPLES 2–5

These Examples illustrate the importance of optimizing the pH of the impregnating solution of Example 1. The same procedure described in Example 1 employing the same support and the same reagents was carried out except that the pH of the impregnating solution was adjusted to different values by varying the amount of sulfur dioxide gas, which is the source of sulfite ion as well as the neutralizing agent.

The results are given in the table below:

|       | pH of Impregnating solution | Bulk Density (g/ml) | Catalytic Activity $k_v \times 10^{-7}$ at 432° C. | Durability Acc. Abr. Loss (%) |
|-------|-----------------------------|---------------------|---------------------------------------------------|-------------------------------|
| Ex. 2 | 9                           | 0.68                | 119 ± 6                                           | 6                             |
| Ex. 3 | 11                          | 0.72; 0.76          | 100 ± 5<br>93 ± 7                                 | 8;6*<br>8;5*                  |
| Ex. 4 | 12                          | 0.83                | 63                                                | 2                             |
| Ex. 5 | 8                           | 0.64                | 97                                                | 18                            |

*Additional calcination at 593° for five hours in addition to regular calcination at 538° C. for four hours.

One sees that a pH from 9–10 provides a commercial acceptable oxidation catalyst, but that outside this narrow range the activity is reduced markedly. At pH 8 the durability as measured by the accelerated abrasion loss is unacceptedly high.

EXAMPLE 6

This Example illustrates another method for preparing potassium vanadate. In this Example potassium vanadate is made from ammonium vanadate and requires elimination of ammonia from the solution by heating:

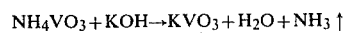

$$NH_4VO_3 + KOH \rightarrow KVO_3 + H_2O + NH_3 \uparrow$$

Also in this Example potassium sulfite rather than sulfur dioxide gas is the source of sulfite ion.

A solution of ammonium vanadate was prepared by slowly adding 140.2 g of reagent grade ammonium vanadate to 200 g of distilled water with stirring. A solution of potassium hydroxide was prepared by slowly dissolving 67.3 g of the reagent grade potassium hydroxide in 200 g of distilled water. The two solutions were carefully mixed with agitatron for a five-minute period and boiled at 100° C. for 30 minutes to remove all traces of ammonia.

To the solution of potassium vanadate was added a solution of 179.4 g of potassium sulfite in 400 g distilled water, and then 22 g of sodium carbonate was added to the potassium vanadate solution to provide the additional alkaline cation of the instant invention. The solution was then diluted to 900 ml for impregnation; it had a pH of 10.

The support, 830 g of a natural diatomaceous earth, containing 0.5 weight percent sodium expressed as the oxide, was wet-mixed with 900 ml. of the impregnating solution containing solubilized vanadium moieties plus sodium ion. The catalyst was mixed in a Hobart Mixer, extruded in a California Pellet Mill to form cylinders 0.8 cm in diameter by 1.2 cm long, dried, calcined, and sulfated as in Example 1.

The finished catalyst had a bulk density of 0.72 g/m, a catalytic activity constant $k_v \times 10^{-7}$ of 115±7, and an accelerated abrasion loss of 3.6 percent.

EXAMPLES 7–9

These Examples illustrate the effects of lowering the vanadium content expressed as the pentoxide from 8.0 percent to 5.5 percent.

The support was the same as in the previous examples, and the shaped catalyst was in the form of 0.8 cm diameter cylinders 0.6 cm long made in the same fashion as in Example 6.

In Example 7 the support is wet-mixed with potassium vanadate, potassium sulfite, and sodium carbonate, dried, and calcined as in Example 6. In Example 8 the product of Example 7 is post-treated by heating for four hours in a stream of air containing nine percent sulfur dioxide at 593° C. In Example 9 the dried catalyst was calcined at 816° C.

After characterization the results were:

|           | Bulk density g/ml | Catalytic Activity $k_v \times 10^{-7}$ | Durability % Acc. Abr. Loss |
|-----------|-------------------|-----------------------------------------|------------------------------|
| Example 7 | 0.62              | 99 ± 7                                  | 7.7                          |
| Example 8 | 0.62              | 127 ± 5                                 | 3.5                          |
| Example 9 | 0.67              | 119 ± 8                                 | 10.8                         |

EXAMPLE 10

This Example illustrates the improvement in the process of this invention by adding a sulfating post-treatment step after the normal calcining and activation steps.

The catalysts of Example 1 were post-treated by heating the samples at 593° C. for two hours in a stream of air containing nine percent sulfur dioxide.

Upon remeasuring catalytic activity and durability for these samples the results were:

|  | Activity $k_v \times 10^{-7}$ | Acc. Abr. Loss (%) |
|---|---|---|
| Example 1A post treated (10A) | 161 ± 6 | 4 |
| Example 1B post treated (10B) | 143 ± 7 | 5 |

These samples show an extremely high catalytic activity coupled with excellent durability.

EXAMPLES 11-14

Examples 11-14 illustrate the effect of varying the calcination temperature between 432° and 649° C. on the catalytic activity of vanadium oxidation catalysts prepared by the process of this invention.

In the same manner as in Example 1, natural diatomaceous earth (830 g) was impregnated with an aqueous solution made by dissolving 194.5 g potassium hydroxide in 238 g distilled water, adding 109 g vanadium pentoxide slowly, then adding 22 g sodium carbonate, bringing the solution to a pH of 10 by slowly bubbling in an air stream containing 14 percent sulfur dioxide, mixing, extruding cylindrical pellets 0.8 cm in diameter by about 1.2 cm long, and drying for eight hours at 120° C. Calcination was then carried out for four hours at various temperatures. All samples were then sulfated for two hours at 432° C. Then the activity and durability were measured as described above with the following results:

|  | Calcination Temperature (°C.) | Catalytic Activity at 432° C. $k_v \times 10^{-7}$ | Durability by Acc. Abr. Loss (%) |
|---|---|---|---|
| Example 11 | 432 | 100 ± 4 | 5.2 |
| Example 12 | 538 | 121 ± 9 | 6.5 |
| Example 13 | 593 | 116 ± 4 | 5.1 |
| Example 14 | 649 | 130 ± 8 | 4.1 |

EXAMPLES 15-17

Examples 15-17 illustrate the result of varying the sulfation-activation temperature between 483° and 593° C. on the catalytic activity of vanadium oxidation catalysts prepared by the process of this invention.

Portions of the catalyst prepared in Example 12 were sulfated with a stream of air containing 2 percent sulfur dioxide and 7 percent of sulfur trioxide for two hours at the different temperatures and characterized with the following results:

|  | Sulfation/ Activation Temperature | Catalytic Activity at 432° C. $k_v \times 10^{-7}$ | Durability by Acc. Abr. Loss % |
|---|---|---|---|
| Example 15 | 483 | 137 ± 3 | 6.8 |
| Example 16 | 538 | 139 ± 18 | 5.9 |
| Example 17 | 593 | 136 ± 2 | 6.5 |

EXAMPLES 18-19

These Examples illustrate the result when sodium hydroxide rather than sodium carbonate is employed as the source of sodium ion as the modifying agent in the impregnation solution.

The procedure of Example 1 was followed except that in place of 22 parts of sodium carbonate 17 parts of sodium hydroxide was used. After impregnation, mixing, extrusion, drying at 120° C., calcining at 538° C. for four hours, and sulfating at 432° C. for two hours, the catalyst was characterized as follows:

|  | Catalytic Activity at 432° C. $k_v \times 10^{-7}$ | Durability by Acc. Abr. Loss (%) |
|---|---|---|
| Example 18 | 130 ± 8 | 6.5;6.1 |

Then the same sample was further post-treated at 593° C. for two hours in an air stream containing nine percent sulfur dioxide and recharacterized:

|  | Catalytic Activity at 432° C. $k_v \times 10^{-7}$ | Durability by Acc. Abr. Loss (%) |
|---|---|---|
| Example 19 | 162 ± 3 | 5.2 |

EXAMPLE 20

This Example illustrates a technical phenomenon well-know to those skilled in the art of oxidation with catalysts containing vanadium, namely that smaller shaped articles are more active then larger shaped articles as catalysts. Larger articles are preferable, however, because the catalytic bed has a lower pressure drop for the same size catalytic bed.

The procedure of Example 6 was followed in every respect except that another extrusion die was used in the California Pellet Mill to produce pellets 0.56 cm in diameter (7/32 inch) rather than 0.80 cm (5/16 inch).

The catalyst properties were as follows:

|  | Bulk Density (g/ml) | Catalytic Activity $k_v \times 10^{-7}$ | Durability by Acc. Abr. Loss (%) |
|---|---|---|---|
| Example 6 0.80 cm dia. | 0.72 | 115 ± 7 | 3.6 |
| Example 20 0.56 cm dia. | 0.70 | 155 ± 16 | 3.5 |

COMPARATIVE EXAMPLE 21

This Example illustrates the results achieved by dry-mixing commercial ingredients with diatomaceous earth and then wetting the mixture with a sodium carbonate solution. Also, the less efficacious potassium sulfate rather than potassium sulfite of the present invention was employed as the source of solubilizing potassium ion.

The support chosen was 830 parts of a natural diatomaceous earth. It was dry-mixed with 320 parts of potassium sulfate and 109 parts of vanadium pentoxide in a Hobart mixer for 30 minutes. Then varying amounts of sodium carbonate solution were added, the paste mixed for an additional 30 minutes, and extruded through a 0.80 cm diameter die in a California Pellet Mill with each strand chopped into cylindrical pellets about 1.2 cm long. The pellets were dried at 120° C. for eight hours, calcined at about 538° C. for four hours, and sulfated at 432° C. for two hours by exposure to an air stream containing about four percent sulfur dioxide and five percent sulfur trioxide.

The catalysts were characterized for catalytic activity and durability with these results:

| Ex. | Wgt. % $Na_2CO_3$ Solution | Bulk Density g/m | Catalytic Activity $k_v \times 10^{-7}$ | Durability Acc. Abr. Loss (%) |
|---|---|---|---|---|
| 21A | no sodium added | 0.54 | 99 ± 4 | 14 |
| 21B | 0.88 | 0.56 | 96 ± 7 | 18 |
| 21C | 1.74 | 0.55 | 120 ± 5 | 15 |
| 21D | 2.59 | 0.56 | 126 ± 8 | 19 |
| 21E | 2.59 as a solid | 0.54 | 102 ± 4 | 20 |
| 21F | 2.59 but $Na_2SO_4$* | 0.54 | 89 ± 2 | 19 |

*0.4 wgt. percent present ab initio

One sees that at optimum sodium ion levels in the range of about 1-3 percent commercially acceptable catalytic activity can be achieved, but that durability is not as high as that from the wet-mix or impregnation methods.

The foregoing examples illustrate the utility of the present invention. The scope of legal protection sought for this invention is set forth below.

I claim:
1. A process for preparing a catalyst for the oxidation of sulfur dioxide which comprises the steps of:
    (a) intimately contacting a siliceous support with a mixture comprising a solution of vanadium (V) pentoxide dissolved in potassium (K) hydroxide to provide a K/V molar ratio between about 2.5 and about 4.0, dissolved gaseous sulfur dioxide, a sufficient amount of a water-soluble sodium (Na) salt of an acid having a pKa between about 3 and about 7 to provide a K/Na molar ratio between about 4 and about 8, and water, the mixture being brought to a pH of about 9 to about 11 before impregnation, to form an impregnated support;
    (b) drying the impregnated support; and
    (c) calcining the dried impregnated support thus providing a catalyst with high durability and high catalytic activity with an alpha-cristobalite content between from about 1 to about 30 percent.

* * * * *